United States Patent
Schupp et al.

(10) Patent No.: US 12,505,372 B2
(45) Date of Patent: Dec. 23, 2025

(54) ISOLATED BOTTOM CORNER GATES FOR SPIN-QUBITS IN A FIN

(71) Applicant: INTERNATIONAL BUSINESS MACHINES CORPORATION, Armonk, NY (US)

(72) Inventors: Felix Julian Schupp, Adliswil (CH); Noelia Vico Trivino, Zurich (CH); Matthias Mergenthaler, Zurich (CH); Andreas Fuhrer Janett, Rueschlikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 702 days.

(21) Appl. No.: 18/048,430

(22) Filed: Oct. 20, 2022

(65) Prior Publication Data

US 2024/0135223 A1  Apr. 25, 2024
US 2024/0232674 A9  Jul. 11, 2024

(51) Int. Cl.
*G06N 10/40* (2022.01)

(52) U.S. Cl.
CPC .................................. *G06N 10/40* (2022.01)

(58) Field of Classification Search
CPC ........ G06N 10/00; G06N 10/20; G06N 10/40; G06N 10/60; G06F 30/39; G06F 30/392; G06F 30/34; H01D 10/794; H01D 62/812; H01D 62/813; H01D 62/814
USPC ........................................................ 716/100
See application file for complete search history.

(56) References Cited

U.S. PATENT DOCUMENTS

| 6,885,055 B2 | 4/2005 | Lee |
| 9,024,387 B2 | 5/2015 | Erickson et al. |
| 2002/0179897 A1* | 12/2002 | Eriksson ............ H10D 48/3835 257/14 |
| 2011/0079852 A1* | 4/2011 | Lander ................. H10D 30/024 438/164 |

(Continued)

FOREIGN PATENT DOCUMENTS

EP   1593150 B1   8/2007

OTHER PUBLICATIONS

Bosco, S. et al., "Fully Tunable Hyperfine Interactions of Hole Spin Qubits in Si and Ge Quantum Dots"; Physical Review Letters (2021); vol. 127:19, 190501-1-7.

(Continued)

*Primary Examiner* — Paul Dinh
(74) *Attorney, Agent, or Firm* — Amin, Turocy & Watson, LLP

(57) ABSTRACT

A qubit device or system having isolated bottom corner gates includes a semiconductor substrate and a semiconductor fin perpendicularly adjoining a top surface of the substrate. The qubit device also includes a first gate located at a first corner between a first side of the fin and the top surface of the substrate, and a second gate located at a second corner between a second, opposite side of the fin and the top surface of the substrate. The first and second gates are electrically isolated from each other and used to control a first quantum dot near the top of the fin. A third gate located at the first corner has a contact for accumulating a channel to facilitate charge transport to and from a second quantum dot located near the bottom of the fin accumulated using the first and second gates.

20 Claims, 11 Drawing Sheets

(56) References Cited

U.S. PATENT DOCUMENTS

| | | |
|---|---|---|
| 2017/0345933 A1 | 11/2017 | Fung |
| 2019/0043966 A1 | 2/2019 | Cheng et al. |
| 2019/0109214 A1 | 4/2019 | Jeon et al. |
| 2019/0252267 A1 | 8/2019 | Xie et al. |
| 2020/0279910 A1* | 9/2020 | Basu ................. H10D 30/6735 |
| 2021/0193671 A1 | 6/2021 | Jourba et al. |

OTHER PUBLICATIONS

Endo, K. et al., "Four-Terminal FinFETs Fabricated Using an Etch-Back Gate Separation";, IEEE Transaction on Nanotechnology (2007); vol. 6:2, pp. 201-205.

Orlowski, M. et al., "CMOS Challenges of Keeping up with Moore's Law"; 13th International Conference on Advanced Thermal Processing of Semiconductors—(RTP 2005); 19 pgs.

Yin, H. et al., "Scalable 3-D Fin-Like Poly-Si TFT and Its Nonvolatile Memory Application"; IEEE Transactions on Electron Devices (2008); , vol. 55:2; pp. 578-584.

Vinet, M. et al., "Towards Scalable Silicon Quantum Computing"; IEEE International Electron Devices Meeting (IEDM—2018); 4 pgs.

* cited by examiner

ISOLATED BOTTOM CORNER GATES FOR SPIN-QUBITS IN A FIN

BACKGROUND

Technical Field

The present disclosure generally relates to structures of qubit devices and corresponding fabrication processes.

Description of the Related Arts

Quantum computation exploits quantum phenomena for information processing and communication. Various models of quantum computation exist, and the most popular models include the concepts of qubits and quantum gates. A qubit is a generalization of a bit that has two possible states, but can be in a quantum superposition of both states. A quantum gate describes the transformation that one or more qubits will experience after the gate is applied on them, given their initial state. Various quantum phenomena, such as superposition and entanglement, do not have analogs in the world of classical computing and therefore may involve special structures, techniques, and materials.

SUMMARY

Some embodiments of the disclosure provide an architecture for a qubit device having isolated bottom corner gates. The isolated bottom corner gates enable additional functionality, better tunability and higher device density than without bottom gates.

In some embodiments, a qubit device includes a semiconductor substrate and a semiconductor fin perpendicularly adjoining a top surface of the substrate. The qubit device also includes a first metallic gate located at a first corner between a first side of the fin and the top surface of the substrate, and a second metallic gate located at a second corner between a second, opposite side of the fin and the top surface of the substrate. The first and second gates are electrically isolated from each other and are used to control a first quantum dot in the fin. In some embodiments, additional metallic gates at the first and second corners are fabricated. For example, third and fourth gates are electrically isolated from each other and are electrically charged to control the second quantum dot in the fin. In some embodiments, the first and second metallic gates provide a first control local to the first quantum dot and the third and fourth metallic gates provide a second control local to the second quantum dot.

In some embodiments, the first quantum dot is located near the top of the fin. A third metallic gate located at the first corner has a contact for accumulating a channel in the fin and in the substrate. The channel is used to facilitate charge transport to and from a second quantum dot that is located near the bottom of the fin. In one embodiment that is compatible with a previous embodiment, the second quantum dot is used as a quantum sensor for the first quantum dot.

In some embodiments, third and fourth metallic gates are located at the first corner. The third metallic gate has a contact for accumulating a channel in the fin and in the substrate. The channel facilitates charge transport to an elongated quantum dot that spans first and second qubits. The third metallic gates controls tunnel coupling of the elongated quantum dot with the first qubit. The fourth metallic gate controls tunnel coupling of the elongated quantum dot with the second qubit.

In some embodiments, the isolated bottom corner gates are used to apply electric potential, electric field, magnetic field, and alternate current (AC) electromagnetic fields to drive spin-qubits in a fin. An electrical potential may be applied to the first and second gates to tune a quantum dot (e.g., spin-qubit) wavefunction away from a noisy interface (e.g., top surface of the fin to improve coherence). In some embodiments, the electrical potential is applied to a hole-qubit, or a qubit of another type (e.g., hole charge qubit, electron charge qubit, hole-spin qubit, or electron-spin qubit.) Different electrical potentials may be applied to the first and second gates to apply an electric field to tune a frequency or a coupling strength of the qubit. In some embodiments, the first and second gates may conduct alternate currents (AC) to generate a magnetic field to drive the qubit. In some embodiments, the first gate provides local control of the qubit and the second gate is a drive line along the fin for electron spin resonance (ESR) having interconnect at both ends.

In some embodiments, the first and second gates are fabricated by (i) conformal metallization over the fin and the substrate, and (ii) directional timed etching of the metallization to expose a top section of the fin. The first and second gates are aligned (or self-aligned) and do not extend above the top of the fin. In some embodiments, the first and second corners are recessed underneath the fin.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Qubits implemented based on silicon on insulator (SOI) technology may experience issues at the buried oxide (BOX) interface. A spin qubit may experience increased charge noise when in close proximity to BOX or other interfaces with amorphous materials.

Performing qubit tuning with only top gates is challenging because the top-gate potential affects occupation, tunnel coupling, and g-factor (dimensionless magnetic moment) simultaneously. Existing solutions for electron spin resonance (ESR) drive lines have a large footprint and are difficult to integrate close to the qubits. Furthermore, qubit frequency is difficult to tune without large movement of the wavefunction (e.g., into different local magnetic field). Back gates currently exist in SOI technology but do not provide bottom gates suitable for local control of individual qubits.

Some embodiments of the disclosure provide an architecture qubit device having isolated bottom corner gates along a fin. The isolated bottom corner gates enable additional functionality, better tunability and higher device density than without bottom gates. The isolated bottom corner gates are used to apply electric potential, electric field, magnetic field, and/or alternate current (AC) electromagnetic fields to drive spin-qubits in a fin.

Figure 1A:
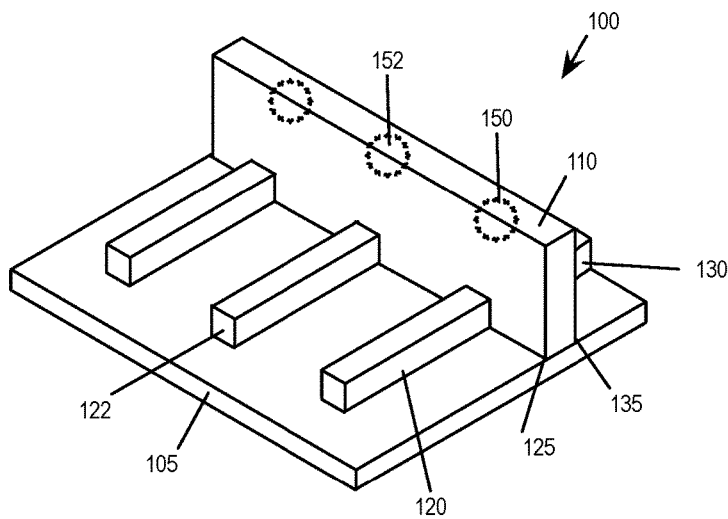
FIGS. 1A-C illustrate a qubit device that includes isolated bottom corner gates along a fin.
Figure 1B:
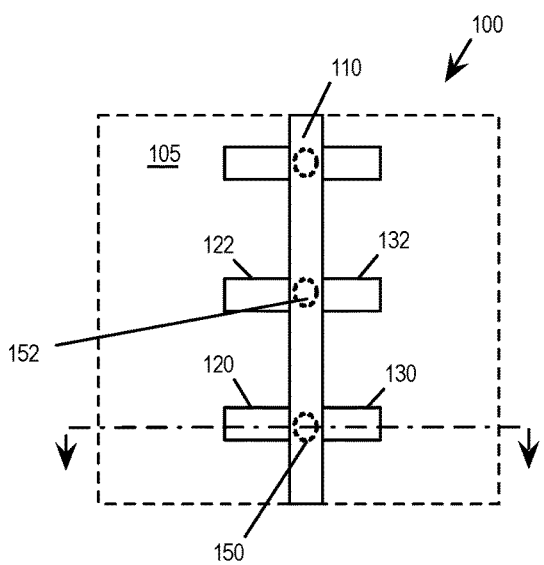
Figure 1C:
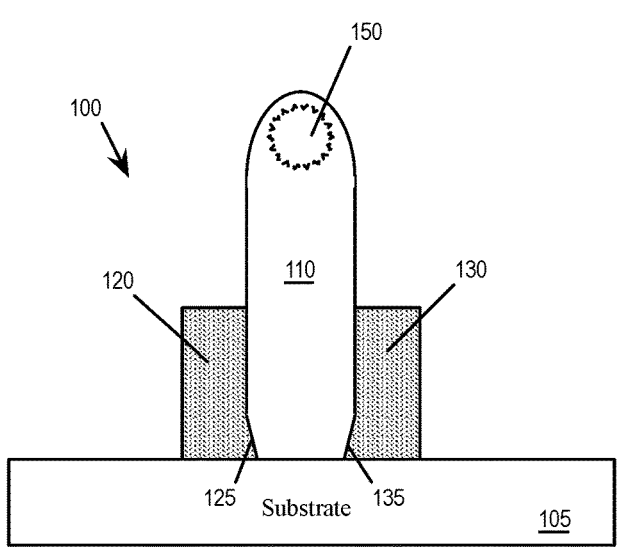

FIGS. 1A-C illustrate a qubit device 100 that includes isolated bottom corner gates along a fin. The isolated bottom gate can be used to drive spin-qubits in the fin of the qubit device 100. FIGS. 1A, 1B, and 1C show the qubit device 100 in a perspective view, a top plan view, and a cross-section view, respectively. As illustrated, the qubit device 100 includes a semiconductor substrate 105, a semiconductor fin 110 perpendicularly adjoining a top surface of the substrate 105. The qubit device 100 includes a first metallic gate 120 located at a first corner 125 (between a first side of the fin 110 and the top surface of the substrate). The qubit device 100 also includes a second metallic gate 130 located at a second corner 135 between a second, opposite side of the fin 110 and the top surface of the substrate 105. In some embodiments, the fin 110 may be under-etched or undercut such that the corners 125 and 135 are recessed underneath the fin 110. This may enhance the gate effect at the corner.

The first gate 120 and the second gate 130 are electrically isolated from each other. The two gates 120 and 130 are therefore also referred to as isolated bottom corner gates. The two gates may be used to form or control a quantum dot or qubit 150 in the fin. A "metallic gate" may refer to a metallic or polysilicon electrode that changes the potential in the semiconductor.

The qubit device 100 also includes other isolated bottom corner gates that are used to drive or control other spin-qubits in the fin 110. In the figure, isolated bottom corner gates 122 and 132 are also located at the corner 125 and 135. The gates 122 and 132 are used to control or form another qubit or quantum dot 152 in the fin 110. The isolated bottom corner gates 122 and 132 are electrically isolated from each other. In some embodiments, the different pairs of isolated bottom corner gates provide local controls to different qubits. For example, the bottom corner gates 120 and 130 provide local control to the qubit 150, while the bottom corner gates 122 and 132 provide local control to the qubit 152.

Figure 2A:
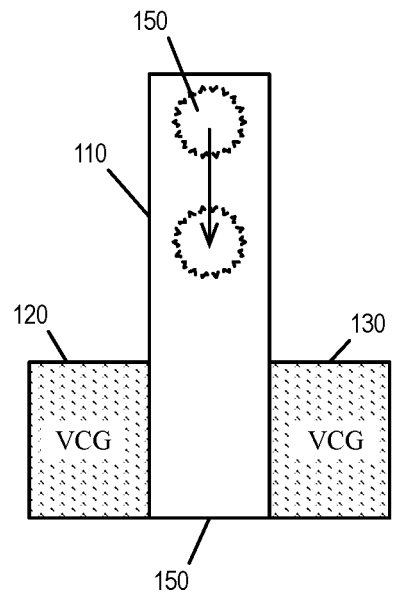
FIGS. 2A-C illustrate using isolated bottom corner gates to affect the operations of a qubit or quantum dot in the fin.
Figure 2B:
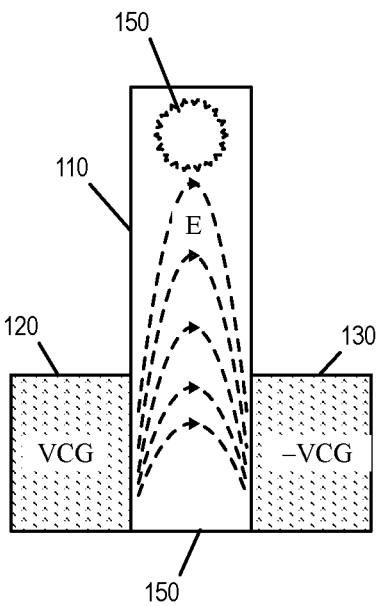
Figure 2C:
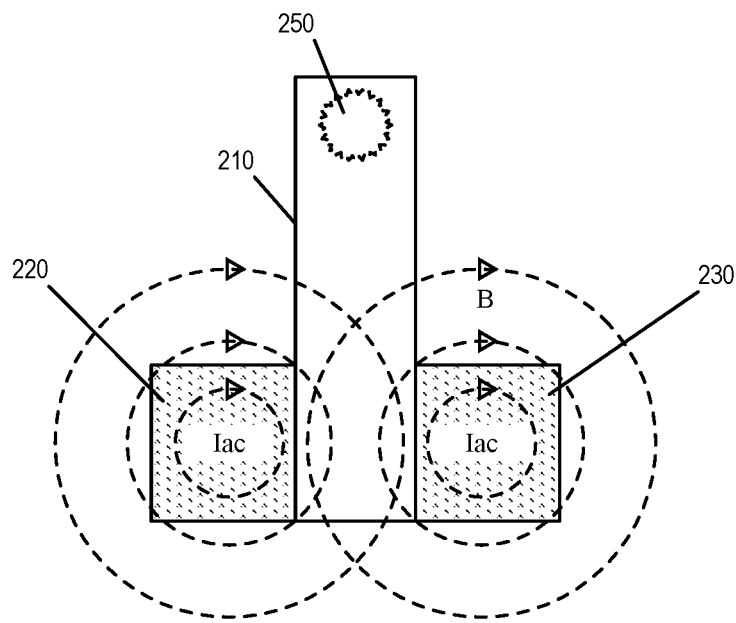

In some embodiments, electrical current or potential can be applied to isolated bottom corner gates to control a quantum dot. FIGS. 2A-C illustrate using isolated bottom corner gates to affect the operations of a qubit or quantum dot in the fin. FIG. 2A shows a certain potential (VCG) being applied to both bottom corner gates 120 and 130 to tune the wavefunction of the spin-qubit 150 away from the top surface of the fin (which is a noisy interface) to improve coherence performance of the qubit. If the qubit is a spin-qubit (whether electron or hole), the potential may also be applied to tune the qubit to suppress charge-noise or fine-tune a sweet-spot to improve coherence. FIG. 2B shows differential potentials VCG and −VCG being applied to the isolated bottom corner gates 120 and 130 to generate an electric field E in the fin 110. The electric field E can be applied to introduce Rashba spin-orbit effects to tune the frequency of the spin-qubit 150. The electric field E can also be used to tune a coupling strength of the qubit with its environment (e.g., a microwave interface or another qubit.)

FIG. 2C shows alternate current (AC) being conducted in an isolated bottom corner gates 220 and 230 to generate magnetic field B to drive a qubit 250 via electron spin resonance (ESR). The isolated bottom corner gates 220 and 230 are elongated structures along the bottom corners of the fin 210 serving as ESR drive lines and may have contacts at both ends.

Though not illustrated, the isolated bottom corner gates (220 and 230, or 120 and 130) can also be used to apply an AC voltage or AC electric field to drive a qubit in a fin via electric dipole spin resonance (EDSR) or via a photonics interface. The EDSR is a drive mode in which the wavefunction is displaced through coupling to its charge and then have either an inhomogeneous magnetic field or spin-orbit that translates the periodic displacement into an effective AC drive for the spin.

In some embodiments, a self-aligned process in FinFET technology is used to fabricate bottom-corner gates along a fin. The process is compatible with bulk intrinsic silicon rather than requiring SOI and/or doped substrates. The process includes: (1) conformal metallization, (2) lithography for fan-out interconnects, (3) timed-etch of metallization, and (4) strip resist to obtain final device with two isolated bottom corner gates. The isolated bottom gates thusly fabricated may enable global control for e.g., global ESR/EDSR drive or global interface proximity tuning, etc.

This fabrication process can also be used to implement ESR lines that are very close to qubits.

Figures 3A, 3B, 3C:
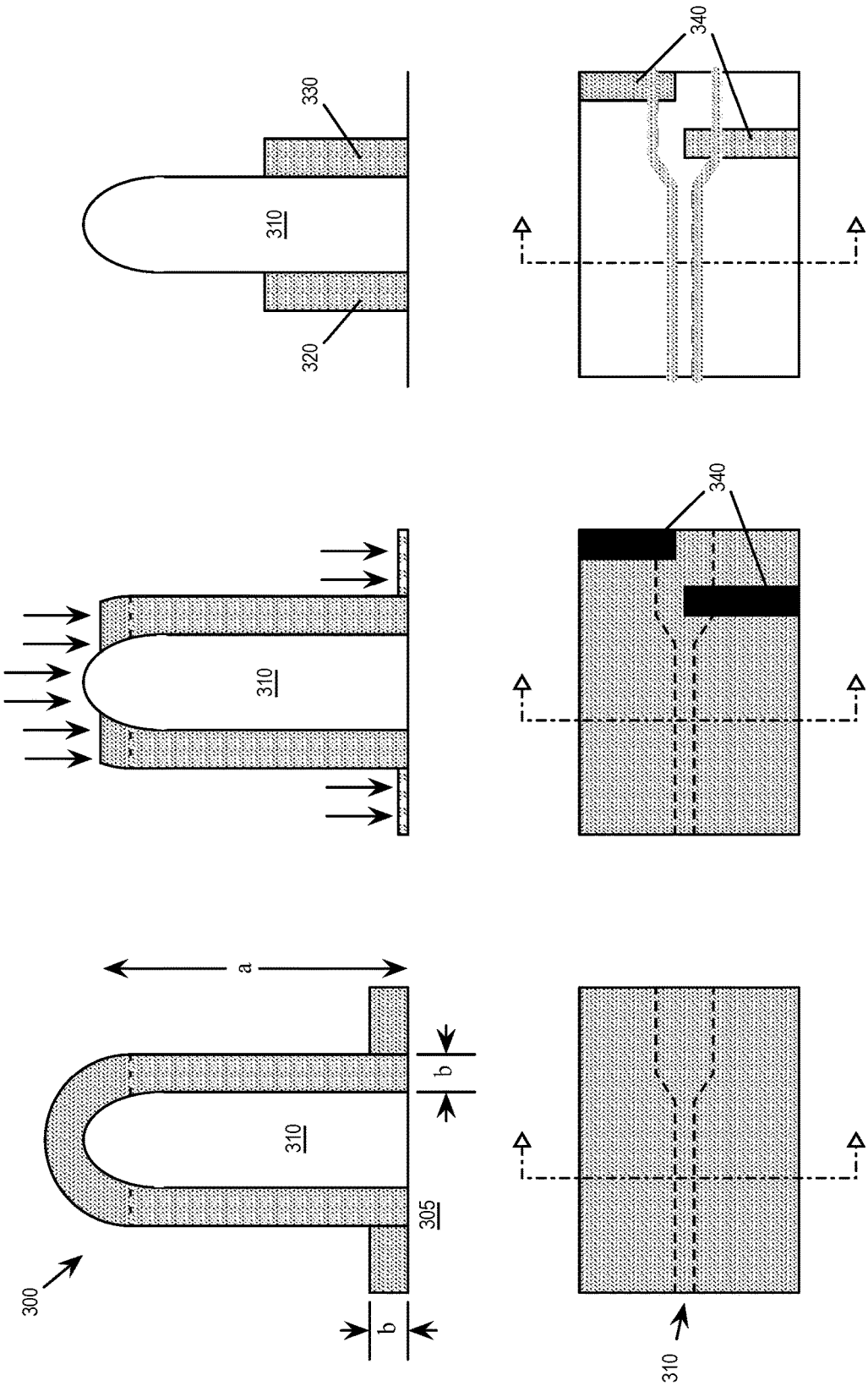
FIGS. 3A-C illustrate some stages of a self-aligned process for fabricating bottom-corner gates along a fin, including conformal metallization and timed-etching.

FIGS. 3A-C illustrate some stages of a self-aligned process for fabricating bottom-corner gates along a fin, including conformal metallization and timed-etching. Each illustrate stage shows a cross section view and a top plan view of a device 300 being fabricated. FIG. 3A illustrates conformal metallization being applied to a substrate 305 with a fin 310. Such metallization can be atomic layer deposition (ALD). The fin 310 has a height of "a". The metallization being applied has a uniform thickness of "b" everywhere, including along the surface of the fin 310. FIG. 3B illustrates etching being applied to the metallization of the device 300. The etching is configured to stop at a certain time, therefore referred to as timed etching. The etching is also directional, specifically in a top-to-bottom direction. Some regions 340 of the metallization are masked with etch resist as lithography for interconnects. The directional timed etching of the metallization exposes a top section of the fin.

FIG. 3C illustrates the conclusion of timed etching. Since the etching operation is directional, it does not remove all of the metallization at the side surfaces of the fin 310. Instead, a portion of the metallization along the fin 310 remains to become the bottom gate. The remaining pieces of metallization are located along the corners between the fin 310 and the substrate 305. The remaining metallic pieces are also separated by the fin 310 to become bottom corner gates 320 and 330. The bottom corner gates 320 and 330 do not extend above the top of the fin 310. Metallization in the region 340 (protected by the resist masks from etching) remain to become interconnects. The isolated bottom corner gates 320 and 330 are elongated structures that run along the bottom corners of the fin 310. They can conduct AC currents to serve as ESR drive lines for qubits or quantum dots in the fin 310.

As shown in the example of FIGS. 1-C, the isolated bottom corner gates can be used to enable local control of individual qubits. Such local qubit control gates can be fabricated starting from conformally metallized fin. FIGS. 4A-D illustrate some stages of fabricating isolated bottom corner gates as local qubit control gates. The figure shows the fabrication of a qubit device 400 having a fin 410. Each of FIGS. 4A-D shows a top view and two corresponding cross-section views of the qubit device 400.

Figure 4A:
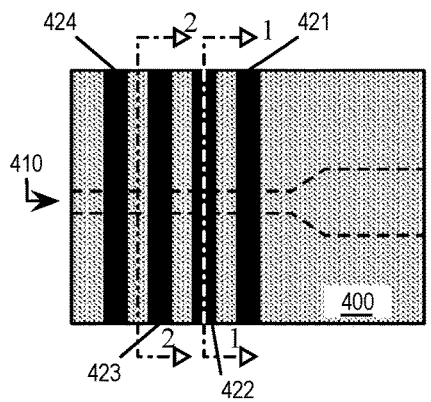
FIGS. 4A-D illustrate some stages of fabricating isolated bottom corner gates as local qubit control gates.
Figure 4A:
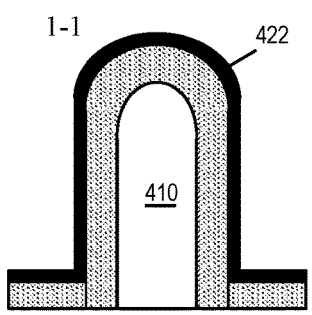
Figure 4A:
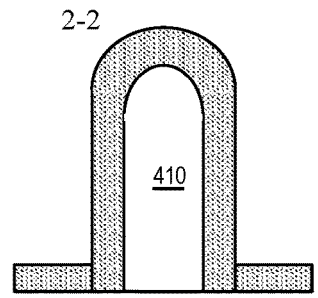
Figure 4B:
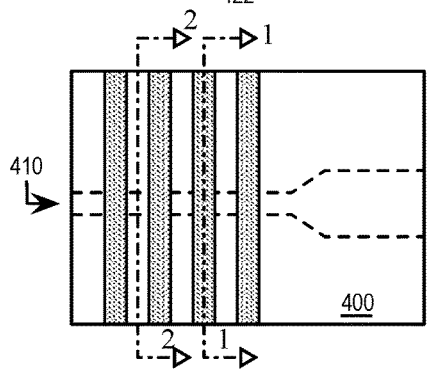
Figure 4B:
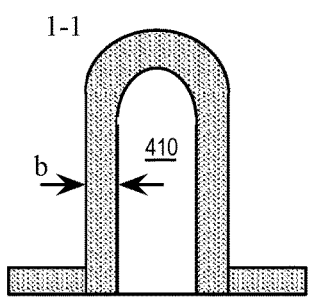
Figure 4B:
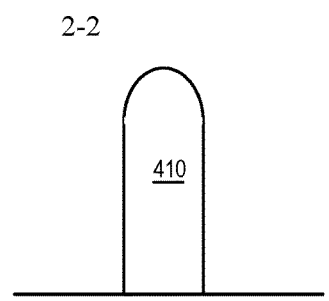

FIG. 4A shows an initial fabricating stage, at which conformal metallization with uniform thickness is applied over the entire qubit device 400, including over the fin 410. In addition, lithograph of resist masks 421-424 are applied to define gates along the fin. This may require accurate alignment of the resist masks to qubits in fin direction. In addition to the gates themselves, the fan-out connections of the gates can also be defined. FIG. 4B shows the qubit device 400 after etching is applied. The etching strips off all metallization except for the regions protected by the resist masks 421-424.

Figure 4C:
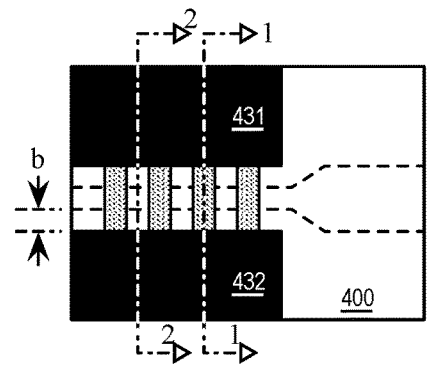
Figure 4C:
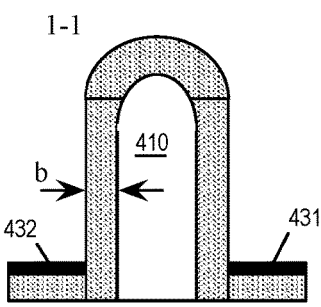
Figure 4C:
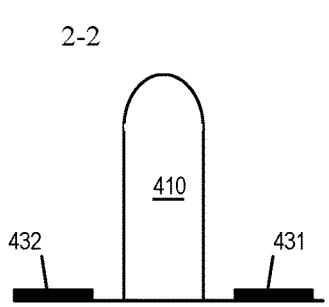

FIG. 4C shows resist mask 431 and 432 being applied to protect portions of the remaining metallization from subsequent timed etching. The protected portion are to serve as interconnects for the gates along the fin. The lateral metallization thickness on the fin ("b") is maintained to form the bottom corner gates.

Figure 4D:
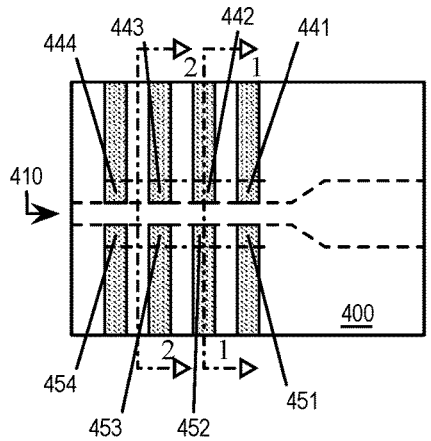
Figure 4D:
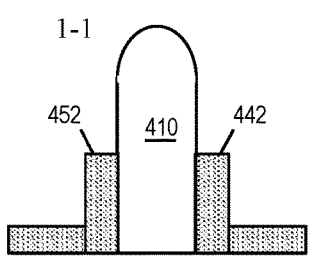
Figure 4D:
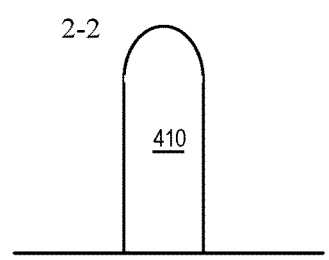

FIG. 4D shows the result of the timed etching. As illustrated, the etching has removed the metallization over the top of the fin 410 and portions alongside the fin. The remaining pieces of the metallization alongside the fin 410 become isolated bottom corner gates 441-444 and 451-454. The metallization protected by the resist masks 431 and 432 become interconnects for the newly formed isolated bottom corner gates. Each pair of bottom corner gates (e.g., 442 and 452) can be used to provide local control or tuning to a qubit or quantum dot. Each pair of bottom corner gates are self-aligned in the fin direction, since the two gates are formed by etching a same piece of metal.

In some embodiments, the isolated bottom corner gate platform can also be used to enable global ESR drive as well as local control. This could be applied in a scheme with individual frequency tuning of qubits in combination with a global drive. FIGS. 5A-D illustrate some stages of fabricating isolated bottom corner gates as local qubit control gates and global ESR drive. Each of FIGS. 5A-D shows a top view and two corresponding cross-section views of the qubit device 500.

Figure 5A:
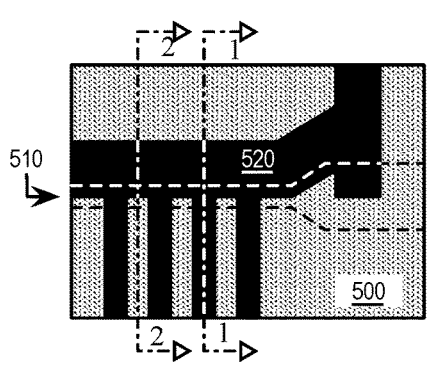
FIGS. 5A-D illustrate some stages of fabricating isolated bottom corner gates as local qubit control gates and global ESR drive.
Figure 5A:
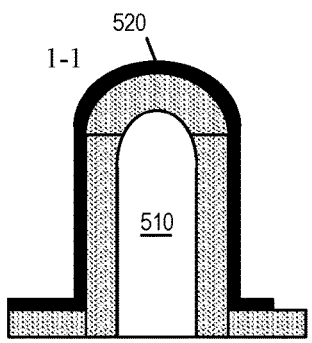
Figure 5A:
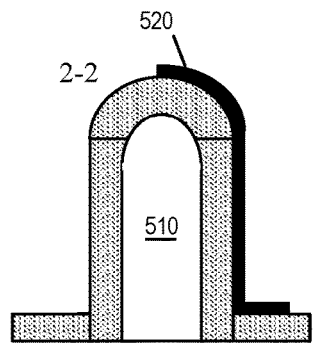
Figure 5B:
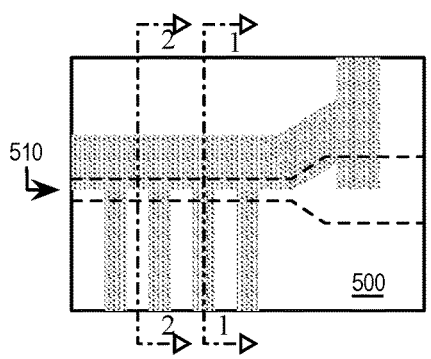
Figure 5B:
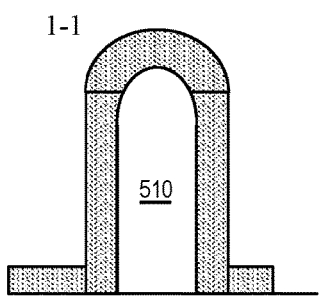
Figure 5B:
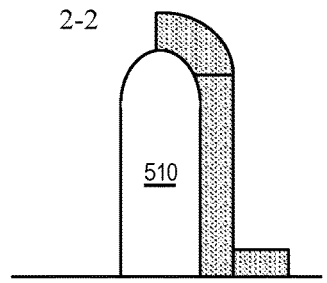

FIG. 5A shows an initial fabricating stage, at which conformal metallization with uniform thickness is applied over the entire qubit device 500, including over the fin 510. The figure shows the fabrication of a qubit device 500 having a fin 510. In addition, a resist mask 520 is applied to define lithography for gates along the fin as well as a global ESR drive line. The resist mask 520 can also be used to define fan-out interconnects for the gates and the ESR drive line. FIG. 5B shows the qubit device after etching is applied. The etching strips off all metallization except for the regions protected by the resist masks 520.

Figure 5C:
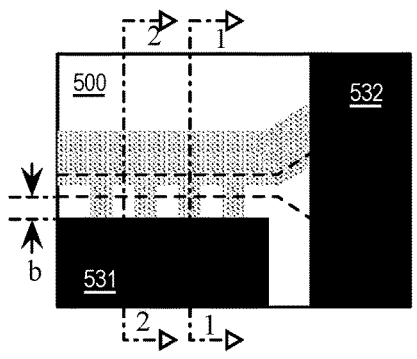
Figure 5C:
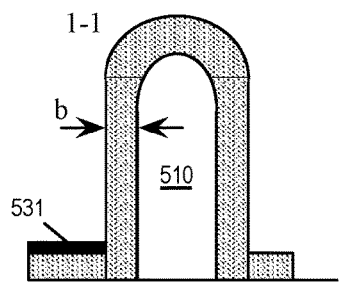
Figure 5C:
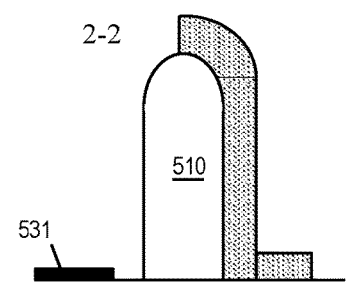

FIG. 5C shows resist masks 531 and 532 being applied to protect portions of the remaining metallization from subsequent timed etching. The protected portion are to serve as interconnects for the gates along the fin. The lateral metallization thickness on the fin ("b") is maintained to form the bottom corner gates.

Figure 5D:
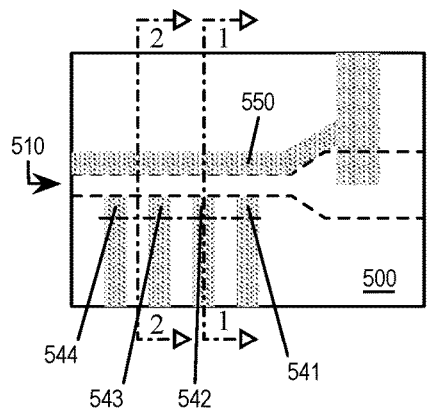
Figure 5D:
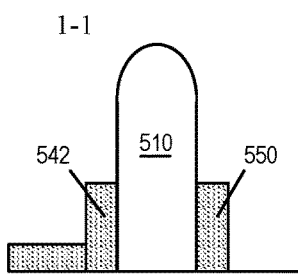
Figure 5D:
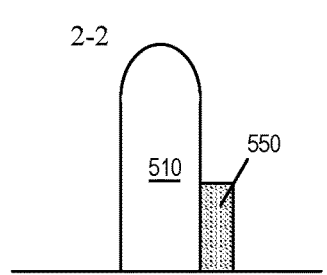

FIG. 5D shows the result of the timed etching. As illustrated, the etching has removed the metallization over the top of the fin 510 and portions alongside the fin. The remaining pieces of the metallization at southside of the fin 510 become isolated bottom corner gates 541-544. The remaining portion of the metallization that runs along the northside of the fin 510 become ESR drive line 550. The metallization protected by the resist masks 531 and 532 become interconnects for the isolated bottom corner gates 541-544 and for the ESR drive line 550. The bottom corner gates 541-544 can be used to tune or control qubits or quantum dots in the fin 510 while the ESR drive line 550 may provide a global drive or DC bias.

Figure 6:
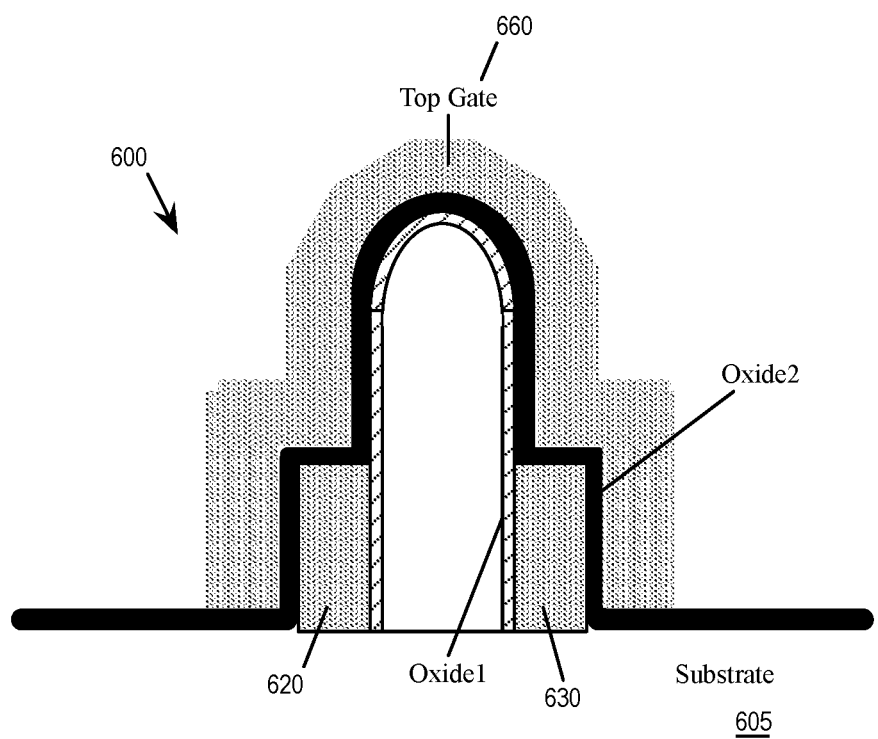
FIG. 6 illustrates an example qubit device having both top-gates and bottom gates.

In some embodiments, the gate structures of FIGS. 3-5 can be buried in oxide. A top-gate can then be fabricated by depositing metal (e.g., conformal metallization) over the oxide-buried gate structures. FIG. 6 illustrates an example qubit device 600 having both top-gates and bottom gates. The qubit device 600 is similar to the qubit device 100 of FIG. 1 in that the device 600 also has a semiconductor substrate 605 and a semiconductor fin 610, with bottom corner gates 620 and 630. A layer of oxide (oxide2) is deposited over the fin 610 and the bottom corner gates 620 and 630. An additional layer of metallization is used to form a top gate 660.

In some embodiments, simultaneous gating formed at both sides of the fin can also accumulate quantum dots on the bottom of the fin. The platform of isolated bottom corner gates can be extended to implement charge-sensor quantum dots on the bottom of the fin in addition to the qubits on the top. These sensors have no footprint on the qubit layer, which is beneficial for scaling. The bottom quantum dots may also enable multi-qubit gates via super-exchange.

Figure 7A:
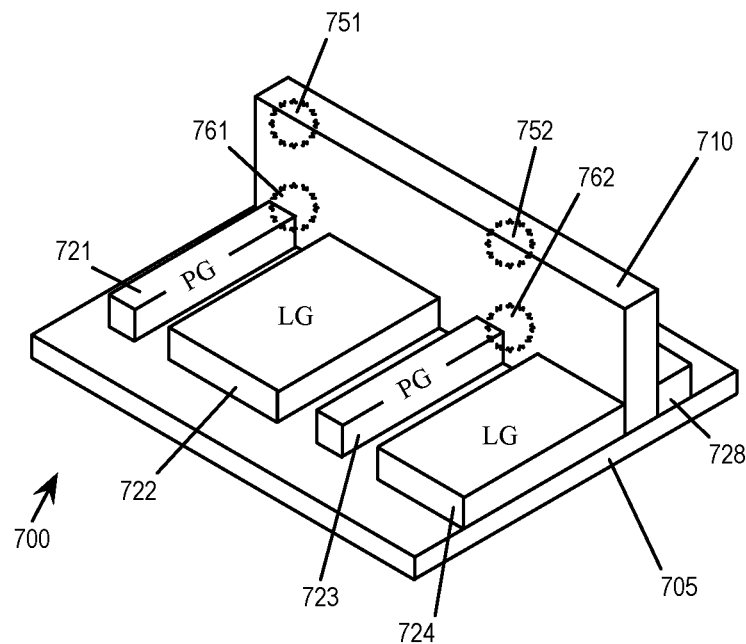
FIGS. 7A-C illustrate an example qubit device that accumulates quantum dots along the bottom of the fin, in addition to quantum dots or qubits along the top of the fin.
Figure 7B:
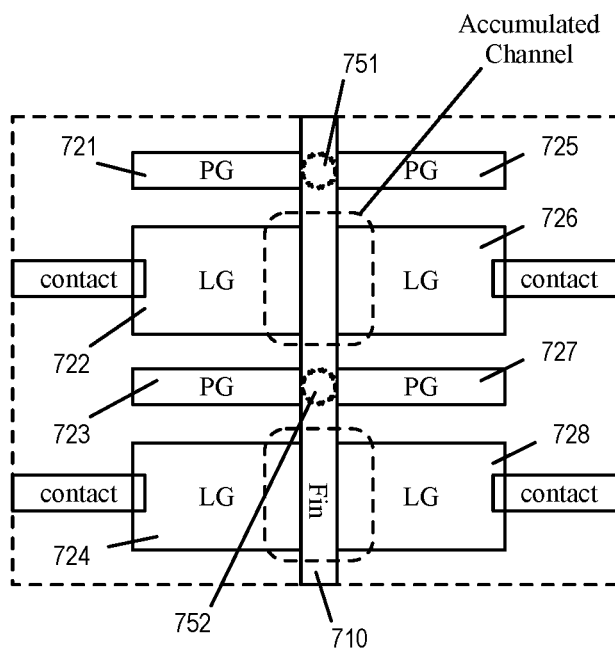
Figure 7C:
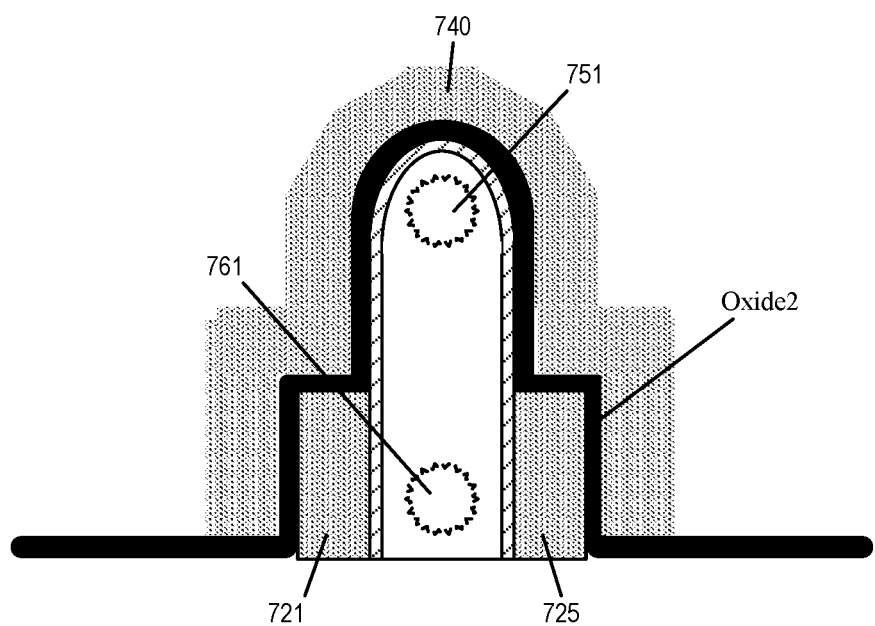

FIGS. 7A-C illustrate an example qubit device 700 that accumulates quantum dots along the bottom of the fin, in addition to quantum dots or qubits along the top of the fin. FIGS. 7A, 7B, and 7C show the qubit device 700 in a perspective view, a top plan view, and a cross-section view, respectively. As illustrated, the qubit device 700 has substrate (or planar silicon) 705 and a fin 710 adjoining the top surface of the substrate 705. The device 700 also has several isolated bottom corner gates 721-728 along sides of the fin 710. Several quantum dots are formed in the fin 710: quantum dots 751 and 752 that are formed along the top of the fin 710; and quantum dots 761 and 762 that are formed along the bottom of the fin 710.

Some of the isolated bottom corner gates are used as lead gates (LGs), while others are used as plunger gates (PGs). PGs are used for accumulating and controlling quantum dots. LGs are used for creating leads, which are channels toward quantum dots. A channel is usually relatively large with respect to number of charges as to have no significant energy quantization. On the other hand, a quantum dot is relatively small with respect to number of charges as to have significant energy quantization with respect to the number of charges (i.e., there is a significant difference between the energies of a quantum dot with N and N+1 electrons/holes.).

High potential on LGs (gates 722, 724, 726, 728) accumulate to form a channel in the fin 710 and the planar silicon 705 to serve as leads to bring in electrical charge for the bottom quantum dots 761 and 762. Low potential on PGs (gates 721, 723, 725, 727) accumulates on bottom of the fin 710 (but not on the planar silicon 705.) With PGs on both sides of the fin 710, the quantum dot region in the fin can be gated from both sides and accumulate in the fin before accumulating under the PGs in the planar silicon 705 (otherwise the accumulation would be under the PGs before formation of the quantum dot.) This allows quantum dots to form along the bottom of the fin 710. The top quantum dots 751 and 752 may be used as qubits, while the bottom quantum dots 761 and 762 may be used as charge sensors for reading out the spin of the top qubits or quantum dots 751 and 752.

As illustrated in FIG. 7B, LGs on both sides of the fin 751 have overlap contact to bring in charge. However, in some embodiments, only the LG on one side of a quantum dot has a source contact, as a single source for a quantum dot is sufficient and a drain is not required. (A charge sensor can be read out using a reflected AC signal.) In some embodiments, the charge sensor can be formed with only one LG on one side of the fin 710 if the LG accumulates strongly enough. In other words, LGs 726 and 728 are optional, as only one LG (on one side of the fin) may be needed for a pair of PGs to form a quantum dot. (The pair of PGs are still needed for accumulation in the fin.)

FIG. 7C shows the qubit device 700 having both top-gates and bottom gates. The qubit device 700 is similar to the qubit device 600, i.e., a layer of oxide (oxide2) is deposited over the fin 710 and the bottom corner gates (e.g., 721 and 725). An additional layer of metallization is used to form the top gate 740. In some embodiment, the top gate 740 is used to control the top quantum dot (or qubit) 751 while the bottom corner gates 721 and 725 are used to control the bottom quantum dot (or sensor) 761.

In some embodiments, an accumulated quantum dot created by the isolated bottom corner gates may be elongated along the fin and span multiple qubits that are located on the top of the fin. Through tunnel coupling of the qubits to this elongated quantum dot, a multi-qubit quantum gate can be realized. This elongated quantum dot can also be referred to as a large coupling dot.

Figure 8A:
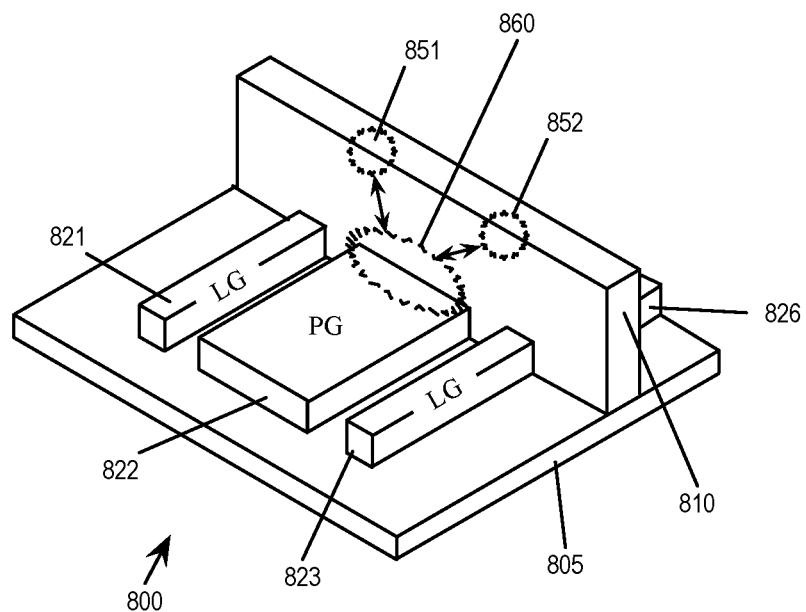
FIGS. 8A-B illustrate forming a two-qubit gate using isolated bottom corner gates in the qubit device.
Figure 8B:
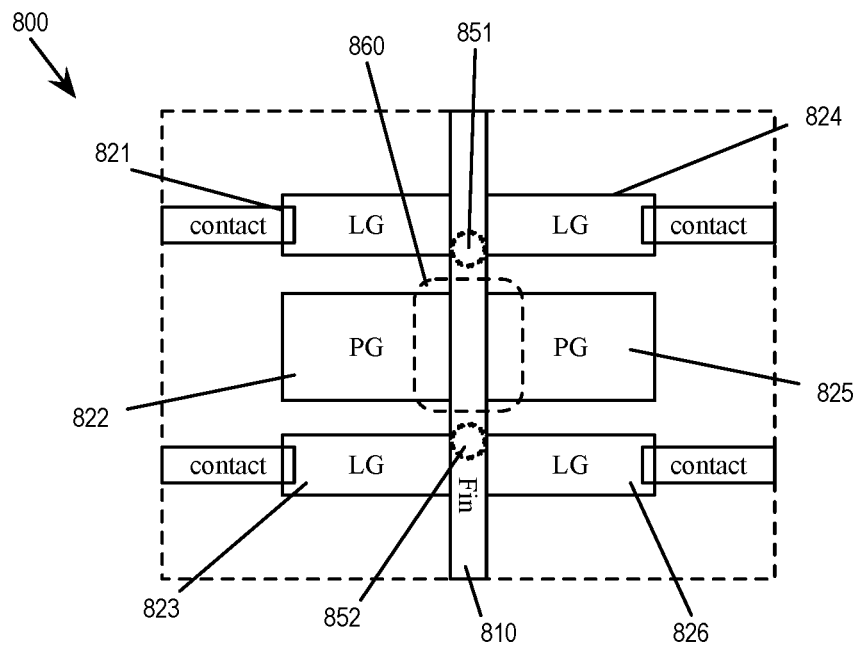

FIGS. 8A-B illustrate forming a two-qubit gate using isolated bottom corner gates in a qubit device 800. The qubit device 800 has a fin 810 and isolated bottom corner 821-826. The bottom corner gates 821, 823, 824, and 826 are LGs, and the bottom corner gates 822 and 825 are PGs. The two PGs 822 and 825 on opposite sides of the fin 810 are used for accumulating a large coupling dot (elongated quantum dot) 860 on the bottom of the fin 810. Gating of the fin 810 from both sides ensures accumulation of the quantum dot 860 in the fin 810 and not under the gates.

The LGs 821 and 823 are implemented on one side of the fin 810 to accumulate on the planar silicon 805 as well as at the bottom of the fin 810. The LGs 821 and 823 both have connections to contacts to bring in the electrical charges. The LGs 821 and 823 are highly accumulated to create channels in the planar silicon 805 as well as along the bottom of the fin 810. The accumulated channels created by LGs 821 and 823 can provide transport (or lead) for charges to and from the large coupling dot 860. The LGs 824 and 826 are optional. They are on the other side of the fin 810 and may make it easier to accumulate in the fin 810 (or achieve some tunability for qubits 851 and 852 on top of the fin). Contacts for LGs 824 and 826 are also optional (provided LG 821 or LG 823 has contact).

After the large quantum dot 860 is accumulated, the LG channels may be switched off (no longer transporting charge from the contact) and the large quantum dot would remain accumulated. The LGs can then be used to control the wavefunctions of the qubits 851 and 852 on top of the fin. Specifically, a LG can be used to tune the wavefunction of a qubit closer or further away from the large coupling dot 860. This provides a mechanism for controlling the wavefunction overlap between the qubit and the coupling dot and therefore the tunnel coupling. The qubit device 800 can therefore operate a two-qubit quantum gate when the LGs 821 and 823 are used to control the tunnel couplings between the large coupling dot 860 and the qubits 851 and 852.

Figure 9:
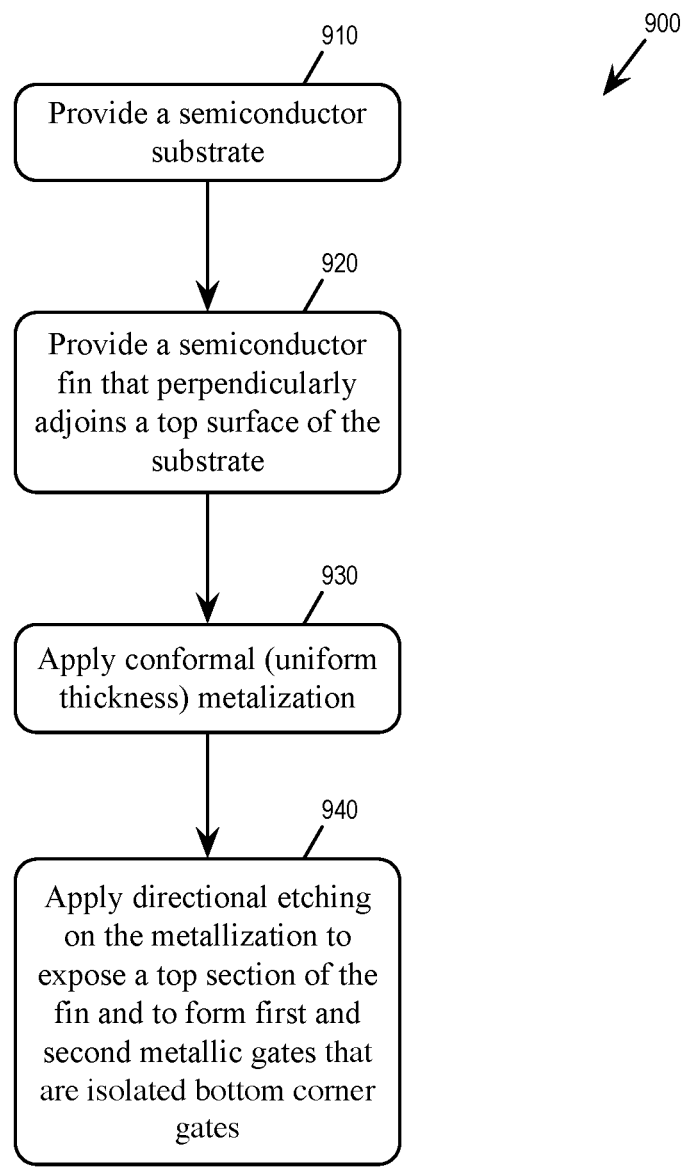
FIG. 9 conceptually illustrates a process for fabricating a qubit device having isolated bottom gates along a fin, consistent with an illustrative embodiment.

FIG. 9 conceptually illustrates a process 900 for fabricating a qubit device having isolated bottom gates, consistent with an illustrative embodiment. In some embodiments, one or more processing units (e.g., processor) of a fabrication system perform the process 900 by executing instructions stored in a computer readable medium. The process 900 can be used to fabricate the qubit devices described by reference to FIGS. 1-8 above.

The flowchart in FIG. 9 illustrates the operation of possible implementations of systems, methods, or computer program products according to various embodiments of the present disclosure. In this regard, each block in the flowchart may represent a module, segment, or portion of instructions for implementing the specified operation(s). In some alternative implementations, the operations noted in the blocks may occur out of the order noted in the FIG. 9. For example, two blocks shown in succession may, in fact, be executed substantially concurrently, or the blocks may sometimes be executed in the reverse order, depending upon the operations involved.

The fabrication system provides (at block 910) a semiconductor substrate. The fabrication system also provides (at block 920) a semiconductor fin that perpendicularly adjoins a top surface of the substrate.

The fabrication system applies (at block 930) conformal metallization (with uniform thickness) over the fin and the substrate. In some embodiments, the system also applies etching resist masks as lithography to define interconnects, local gates, ESR drive lines, etc.

The fabrication system applies (at block 940) directional etching to the metallization to expose a top section of the fin and to form first and second metallic gates. The first metallic gate is located at a first corner between a first side of the fin and the top surface of the substrate. The second metallic gate is located at a second corner between a second, opposite side of the fin and the top surface of the substrate. Metallization that are not protected by the resist masks are removed. The etching is timed so only a portion of the metallization over the fin is removed to form the first and second metallic (isolated bottom corner) gates. The first and second gates are electrically isolated from each other and can be used to control a first quantum dot (or qubit) in the fin. The qubit is a first quantum dot formed near the top of the fin. In some embodiments, the first and second gates are further used to control a second quantum dot near the bottom of the fin, with the second quantum dot used as a quantum sensor for the first quantum dot, or as a second qubit, or as a coupling dot that enables a two-qubit quantum gate between the qubits on the top of the fin. In some embodiments, the first gate provides local control of the qubits and the second gate is a global drive line for electron spin resonance (ESR).

The etching may also form additional (e.g., third and fourth) metallic (isolated bottom corner) gates at the first and second corners respectively. The third and fourth gates are electrically isolated from each other and can be electrically charged to form a second quantum dot or qubit in the fin.

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIG. 9) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
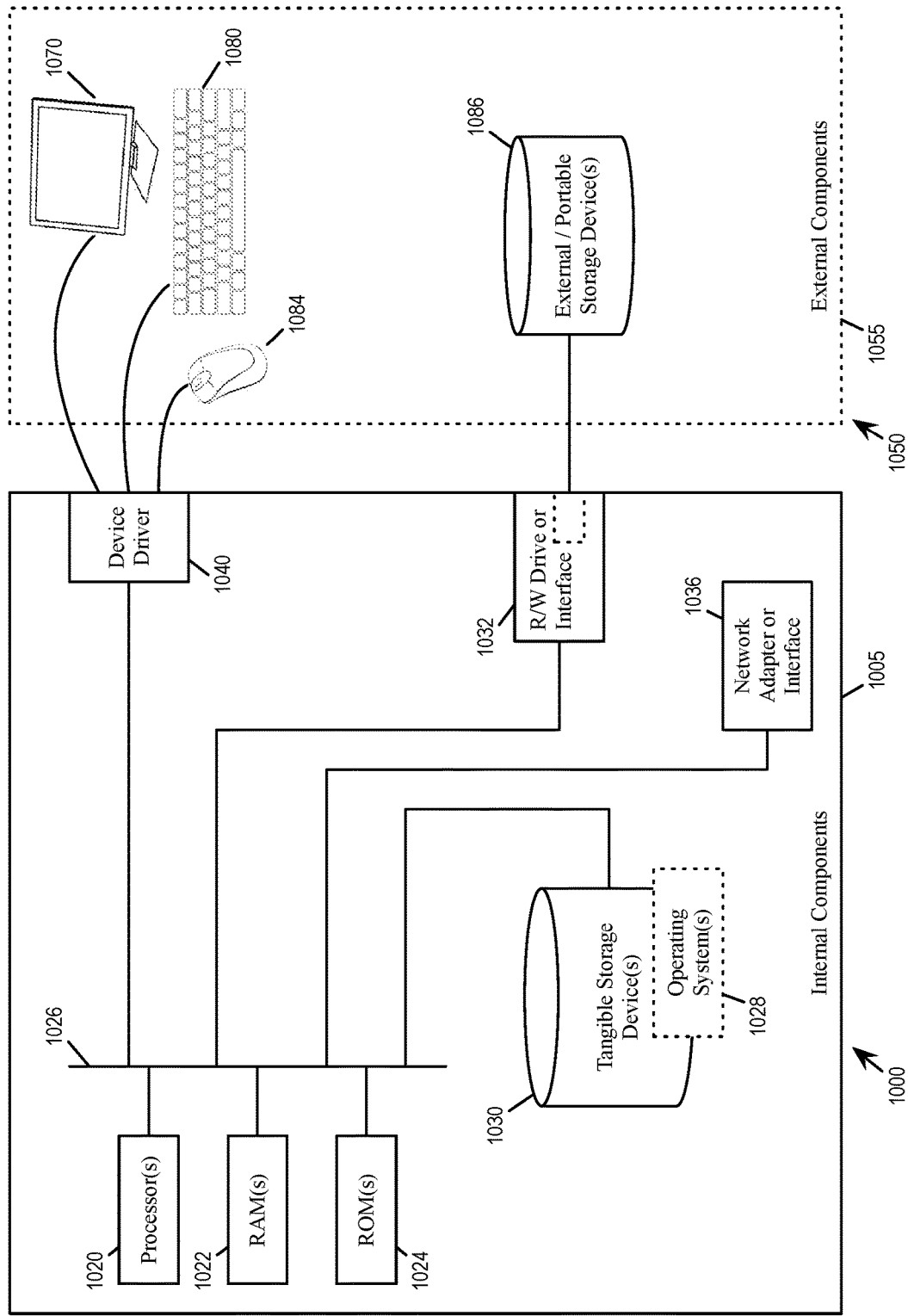
FIG. 10 shows a block diagram of the components of a data processing system in accordance with an illustrative embodiment of the present disclosure.

FIG. 10 shows a block diagram of the components of data processing systems 1000 and 1050 that may be used to implement a fabrication system for fabricating a qubit device having isolated bottom corner gates. It should be appreciated that FIG. 10 provides only an illustration of one implementation and does not imply any limitations with regard to the environments in which different embodiments may be implemented. Many modifications to the depicted environments may be made based on design and implementation requirements.

Data processing systems 1000 and 1050 are representative of any electronic device capable of executing machine-readable program instructions. Data processing systems 1000 and 1050 may be representative of a smart phone, a computer system, PDA, or other electronic devices. Examples of computing systems, environments, and/or configurations that may represented by data processing systems 1000 and 1050 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 1000 and 1050 may include a set of internal components 1005 and a set of external components 1055 illustrated in FIG. 10. The set of internal components 1005 includes one or more processors 1020, one or more computer-readable RAMs 1022 and one or more computer-readable ROMs 1024 on one or more buses 1026, and one or more operating systems 1028 and one or more computer-readable tangible storage devices 1030. The one or more operating systems 1028 and programs such as the programs for executing the process 900 are stored on one or more computer-readable tangible storage devices 1030 for execution by one or more processors 1020 via one or more RAMs 1022 (which typically include cache memory). In the embodiment illustrated in FIG. 10, each of the computer-readable tangible storage devices 1030 is a magnetic disk storage device of an internal hard drive. Alternatively, each of the computer-readable tangible storage devices 1030 is a semiconductor storage device such as ROM 1024, EPROM, flash memory or any other computer-readable tangible storage device that can store a computer program and digital information.

The set of internal components 1005 also includes a R/W drive or interface 1032 to read from and write to one or more portable computer-readable tangible storage devices 1086 such as a CD-ROM, DVD, memory stick, magnetic tape, magnetic disk, optical disk or semiconductor storage device. The instructions for executing the process 900 can be stored on one or more of the respective portable computer-readable tangible storage devices 1086, read via the respective R/W drive or interface 1032 and loaded into the respective hard drive 1030.

The set of internal components 1005 may also include network adapters (or switch port cards) or interfaces 1036 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 1036. From the network adapters (or switch port adaptors) or interfaces 1036, the instructions and data of the described programs or processes are loaded into the respective hard drive 1030. The network may comprise copper wires, optical fibers, wireless transmission, routers, firewalls, switches, gateway computers and/or edge servers.

The set of external components 1055 can include a computer display monitor 1070, a keyboard 1080, and a computer mouse 1084. The set of external components 1055 can also include touch screens, virtual keyboards, touch pads, pointing devices, and other human interface devices. The set of internal components 1005 also includes device drivers 1040 to interface to computer display monitor 1070, keyboard 1080 and computer mouse 1084. The device drivers 1040, R/W drive or interface 1032 and network adapter or interface 1036 comprise hardware and software (stored in storage device 1030 and/or ROM 1024).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device comprising:
   a semiconductor substrate;
   a semiconductor fin perpendicularly adjoining a top surface of the substrate;
   a first metallic gate located at a first corner between a first side of the fin and the top surface of the substrate; and
   a second metallic gate located at a second corner between a second, opposite side of the fin and the top surface of the substrate, wherein the first and second gates are electrically isolated from each other.

2. The device of claim 1, wherein the first and second gates do not extend above the top of the fin.

3. The device of claim 1, wherein the first and second corners are recessed underneath the fin.

4. The device of claim 1, wherein the first and second gates are aligned.

5. The device of claim 1 further comprising:
   a third metallic gate at the first corner; and
   a fourth metallic gate located at the second corner, wherein the third and fourth gates are electrically isolated from each other.

6. The device of claim 1, wherein the second gate runs along the fin and has contacts at both ends.

7. A system comprising:
a semiconductor fin perpendicularly adjoining a top surface of a substrate;
a first metallic gate located at a first corner between a first side of the fin and the top surface of the substrate; and
a second metallic gate located at a second corner between a second, opposite side of the fin and the top surface of the substrate, wherein the first and second gates control a qubit or quantum dot in the fin.

8. The system of claim 7, wherein an electrical potential is applied to the first and second gates to tune a quantum dot wavefunction away from a top surface of the fin.

9. The system of claim 8, wherein the electrical potential is applied to at least one of a hole charge qubit, an electron charge qubit, a hole-spin qubit, or an electron-spin qubit.

10. The system of claim 7, wherein different electrical potentials are applied to the first and second gates to apply an electric field to tune a frequency or a coupling strength of the qubit.

11. The system of claim 7, wherein the first or second gates conduct alternate currents (AC) to generate a magnetic field to drive the qubit.

12. The system of claim 7, wherein the first gate provides local control of the qubit and the second gate is a drive line for electron spin resonance (ESR).

13. The system of claim 7, wherein the quantum dot is a first quantum dot, the system further comprising:
a third metallic gate at the first corner; and
a fourth metallic gate located at the second corner, wherein the third and fourth gates (i) are electrically isolated from each other and (ii) are electrically charged to control a second quantum dot in the fin,
wherein the first and second metallic gates provide a first control local to the first quantum dot and the third and fourth metallic gates provide a second control local to the second quantum dot.

14. The system of claim 7, wherein:
the quantum dot is a first quantum dot located near the top of the fin, the system further comprising a third metallic gate located at the first corner;
the third metallic gate has a contact for accumulating a channel in the fin and in the substrate; and
the channel is configured to facilitate charge transport to and from a second quantum dot that is located near the bottom of the fin.

15. The system of claim 14, wherein the second quantum dot is a sensor for the first quantum dot.

16. The system of claim 7, further comprising third and fourth metallic gates located at the first corner, wherein:
the third metallic gate has a contact for accumulating a channel in the fin and in the substrate;
the channel facilitates charge transport to an elongated quantum dot that spans first and second qubits;
the third metallic gate controls tunnel coupling of the elongated quantum dot with the first qubit; and
the fourth metallic gate controls tunnel coupling of the elongated quantum dot with the second qubit.

17. A method comprising:
providing a semiconductor substrate;
providing a semiconductor fin that perpendicularly adjoins a top surface of the substrate;
applying conformal metallization over the fin and the substrate;
applying directional etching to the metallization to expose a top section of the fin and to form first and second metallic gates,
wherein:
the first metallic gate is located at a first corner between a first side of the fin and the top surface of the substrate; and
the second metallic gate is located at a second corner between a second, opposite side of the fin and the top surface of the substrate.

18. The method of claim 17, wherein:
the first and second gates do not extend above the top of the fin; and
the first and second corners are recessed underneath the fin.

19. The method of claim 17, wherein:
the etching further forms third and fourth metallic gates at the first and second corners respectively; and
the third and fourth gates (i) are electrically isolated from each other and (ii) are electrically charged to control a second qubit in the fin.

20. The method of claim 17, wherein:
the etching further forms a third metallic gate at the first corner, the third metallic gate having a contact for accumulating a channel in the fin and in the substrate.

* * * * *